United States Patent
Thieme et al.

(10) Patent No.: US 7,725,497 B2
(45) Date of Patent: May 25, 2010

(54) SYSTEM AND METHOD FOR STANDARDIZED PROCESS MONITORING IN A COMPLEX MANUFACTURING ENVIRONMENT

(75) Inventors: Lutz Thieme, Dresden (DE); Stefan Schueler, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 269 days.

(21) Appl. No.: 11/844,059

(22) Filed: Aug. 23, 2007

(65) Prior Publication Data

US 2008/0059527 A1 Mar. 6, 2008

(30) Foreign Application Priority Data

Aug. 31, 2006 (DE) .................. 10 2006 040 797

(51) Int. Cl.
*G06F 17/30* (2006.01)

(52) U.S. Cl. ..................................... 707/802

(58) Field of Classification Search ............. 707/104.1, 707/802; 700/96; 438/107
See application file for complete search history.

(56) References Cited

U.S. PATENT DOCUMENTS

2002/0192864 A1* 12/2002 Kuiri ......................... 438/107
2003/0204278 A1* 10/2003 Grasshoff et al. ............. 700/96
2004/0207387 A1* 10/2004 Chung et al. ............. 324/158.1

* cited by examiner

*Primary Examiner*—Etienne P LeRoux
(74) *Attorney, Agent, or Firm*—Williams, Morgan & Amerson, P.C.

(57) ABSTRACT

By monitoring a process flow in a complex manufacturing environment on the basis of a technique using standardized data structures, process-related evaluated data structures corresponding to a process history of objects may be recorded with a high degree of coverage. Furthermore, the respective data structures may be stored and maintained within a single database structure, thereby providing united handling of the respective process-related data and significantly increasing data reliability and completeness.

20 Claims, 3 Drawing Sheets

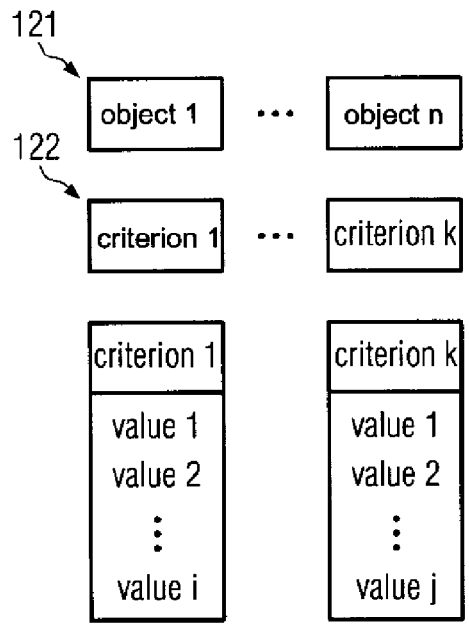
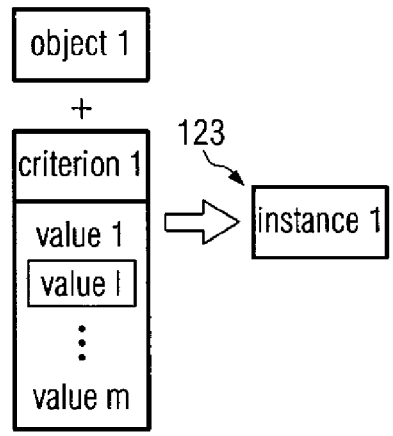
FIG. 1b
FIG. 1c
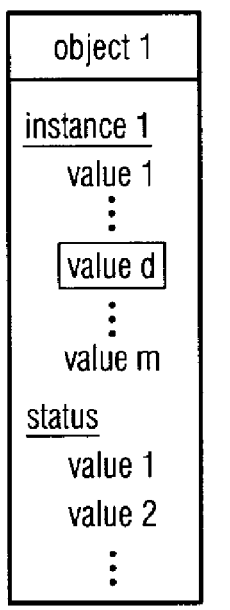
FIG. 1d
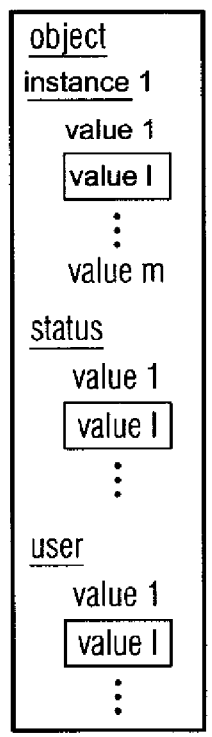
FIG. 1e
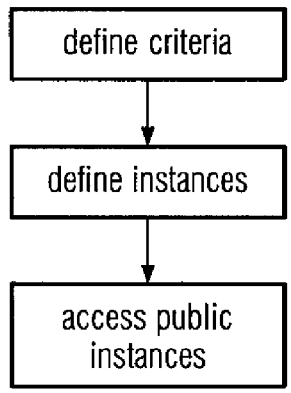
FIG. 1f
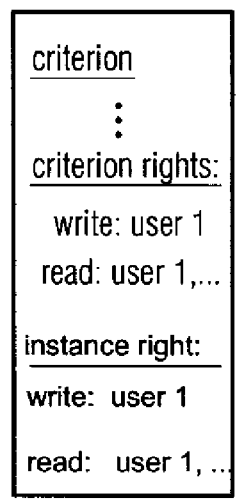
FIG. 1g

SYSTEM AND METHOD FOR STANDARDIZED PROCESS MONITORING IN A COMPLEX MANUFACTURING ENVIRONMENT

BACKGROUND OF THE INVENTION

1. Field of the Invention

Generally, the present disclosure relates to the monitoring of manufacturing processes, and, more particularly, to managing information in a manufacturing environment, such as a semiconductor facility, in which a plurality of different product types and process and metrology tools are operated, in order to improve yield, quality and performance analysis.

2. Description of the Related Art

Today's global market forces manufacturers of mass products to offer high quality products at a low price. It is thus important to improve yield and process efficiency to minimize production costs. This holds especially true in industrial fields in which highly complex process tools operate on complex products according to specified process parameters that may vary between different product types. A prominent example in this respect represents the field of semiconductor fabrication, since, here, it is essential to combine cutting edge technology with mass production techniques. It is, therefore, the goal of semiconductor manufacturers to reduce the consumption of raw materials and consumables for a prescribed product quality while at the same time improve process tool utilization. The latter aspect is especially important since, in modern semiconductor facilities, equipment is required which is extremely cost intensive and represents the dominant part of the total production costs.

Integrated circuits, as one example for a mass product, are typically manufactured in automated or semi-automated facilities, thereby passing through a large number of process and metrology steps to complete the device. The number and the type of process steps and metrology steps a product, such as a semiconductor device, has to go through depends on the specifics of the product to be fabricated. For example, a typical process flow for an integrated circuit may include a plurality of photolithography steps to image a circuit pattern for a specific device layer into a resist layer, which is subsequently patterned to form a resist mask for further processes for structuring the device layer under consideration by, for example, etch or implant processes, deposition processes, heat treatments, cleaning processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. Since many of these processes are very critical, a plurality of metrology steps have to be performed to efficiently control the quality of the process flow. Typical metrology processes may include the measurement of layer thickness, the determination of dimensions of critical features, such as the gate length of transistors, the measurement of dopant profiles, the determination of electrical characteristics and the like. As the majority of the process margins are device-specific, many of the metrology processes and the actual manufacturing processes are specifically designed for the device under consideration and require specific parameter settings at the adequate metrology and process tools.

In many production plants, such as semiconductor facilities, a plurality of different products types are usually manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, specific settings in the various process tools, such as different mask sets for the lithography, different process parameters for deposition tools, etch tools, implantation tools, chemical mechanical polishing (CMP) tools, furnaces and the like, may be necessary. Consequently, a plurality of different tool parameter settings and product types may be encountered simultaneously in a manufacturing environment.

The manufacturing process flow in a complex manufacturing facility is usually controlled by a supervising control system, which is frequently called a Manufacturing Execution System (MES). In a correspondingly controlled manufacturing environment, the process flow, that is, the scheduling of products, the process and metrology tools used, the various process recipes, i.e., the set of parameters of a process performed in a specific tool to achieve a desired process result, the consumables and the raw materials are controlled on the basis of specification limits, which describe the limits between which the respective object to be controlled has to be maintained in order to provide high quality and yield.

The currently practiced process control is, however, usually performed on the basis of individual process modules in an attempt to individually improve the process result of these modules. For instance, the lithography module, involving resist application and treatment, the actual exposure process, post-exposure treatments, resist development and the like, the etch module for transferring resist feature into a process layer and the like, may be monitored with respect to excursions from the specification limits or target tool parameter settings, wherein statistical process control techniques (SPC), advanced process control (APC) strategies and the like may be used for maintaining the individual process modules within the specification limits. Thus, a large amount of process data, such as measurement data from respective metrology tools associated with the various process modules, is created. Various systems have been developed for obtaining and managing the process information obtained from the individual process modules, such as Engineering Request Forms (ERF), Decision Records (DR), material analysis reports, analysis results and the like. Moreover, tool or process excursions or other specific events in the manufacturing environment are typically recorded manually or in proprietary systems. In this way, yield and performance improvement of individual modules may be achieved by, for instance, analyzing data of processed products, tool information and the like. The assessment of interrelated process modules or the process flow as a whole may, however, be very difficult and suffer from a reduced reliability due to the highly "modular" character of the information available for process optimization.

The present disclosure is directed to various systems and methods that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein is directed to a technique that enables the improvement of yield and performance of complex manufacturing environments, such as semiconductor production lines, by providing a standardized platform for handling information regarding the assessment of individual process modules in order to provide a global "overview" over process-related issues of a plurality of process modules or even the entire process flow within the manufacturing environment. For this purpose, individually performed analysis of process data of processed products, the interaction of process steps, tools, tool combinations, the influence and occurrence of queue times, the availability and status of consumables, raw materials and the like may be assessed in a global manner on the basis of appropriately defined information data structures associated with one or more products processed within the manufacturing environment, wherein the respective data structures may be maintained and manipulated in a single database, thereby enhancing data accessibility and data completeness. Thus, information may be available for the product under consideration, which may cover a significant portion of the product history or even the entire product history, including any specific events, such as tool deviations, or any other events that may have a significant influence on the overall efficiency of the process flow in the manufacturing environment. Consequently, by associating the respective products, such as substrates, lots and the like, with the respective information data structures, the process flow history in the manufacturing environment may be monitored in a highly standardized manner, thereby uniting the information "pre-processed" or evaluated in a plurality of different process modules. Hence, a very efficient means for globally estimating yield and performance of the manufacturing environment may be obtained, thereby providing the potential for identifying and correcting respective "bottlenecks" in the manufacturing flow while at the same time significantly reducing the workload for process engineers, since respective information obtained during the entire process history of a product of interest may be readily available and may be manipulated for assessing individual process modules and their mutual interaction. Furthermore, the technique of the subject matter disclosed herein may provide a substantially unified system for collecting process-related information regarding the assessment of at least some or all process modules in a standardized manner in real time, thereby ensuring superior data accessibility and data integrity.

According to one illustrative embodiment disclosed herein, a method comprises defining a plurality of criteria for products of a manufacturing environment, wherein each of the criteria is represented by a predefined data structure for representing a property of a product at least one of a plurality of manufacturing stages of a process flow performed in the manufacturing environment using a plurality of process tools, wherein each of the criteria comprises a respective limited set of predefined characteristic values. The method further comprises receiving process data from the manufacturing environment, wherein the process data comprises information about the at least one of the plurality of manufacturing stages of the products Furthermore, the method includes operating on one of the predefined data structures to select one of the characteristic values associated with the one of the plurality of criteria, wherein the selected characteristic value defines a first instance for the one criterion. Additionally, the method comprises storing and maintaining the predefined data structures associated with the plurality of criteria and the products in a database structure.

According to another illustrative embodiment disclosed herein, a product property management system comprises a property management unit configured to define and manipulate, upon user interaction, predefined data structures representing criteria of products, each criterion associated with a respective set of limited characteristic values, wherein each value indicates a property of one of the products assessed by one or more users, wherein the products are processed by a plurality of process tools of a manufacturing environment according to a specified process flow. A database structure is operatively connected to the property management unit, wherein the single database stores and maintains each of the predefined data structures. An interface is operatively connected to the property management unit and configured to receive and output process information relating to the products and the plurality of process tools of the manufacturing environment and to enable the user interaction.

According to yet another illustrative embodiment disclosed herein, a method comprises defining a predefined data structure for representing a plurality of criteria for products of a manufacturing environment upon user request, each criterion representing a property of a product at one of a plurality of manufacturing stages of a process flow performed in the manufacturing environment using a plurality of process tools. The method further comprises receiving process data from the manufacturing environment, wherein the process data comprises information about the at least one of the various manufacturing stages of the products. Moreover, upon request of a first user, one of a plurality of predefined limited values associated with the one criterion is assigned to one of the criteria on the basis of the process data to define a first evaluated version of the one criterion associated with the first user. Finally, the first version associated with the one criterion and the products is stored and maintained in a single database, wherein the database provides a single point of service and a single point of data source.

BRIEF DESCRIPTION OF THE DRAWINGS

The disclosure may be understood by reference to the following description taken in conjunction with the accompanying drawings, in which like reference numerals identify like elements, and in which:

FIG. 1b schematically illustrates basic elements on which are operated by the system of FIG. 1a for managing product-related information in a highly standardized manner;

FIG. 1c schematically illustrates the process of defining "instances" which are used to impart specific properties to a specified product in accordance with illustrative embodiments;

FIGS. 1d-1e schematically illustrate a further data structure used in the system of FIG. 1a for endowing the instances with further characteristics;

FIG. 1f schematically illustrates a hierarchical structure defining a plurality of different hierarchy levels for accessing data in the system as illustrated in FIG. 1a according to further illustrative embodiments disclosed herein;

FIG. 1g schematically illustrates a data structure according to a further illustrative embodiment, in which access rights for accessing the system of FIG. 1a with respect to information are organized in accordance with a predefined hierarchy.

Figure 1A:
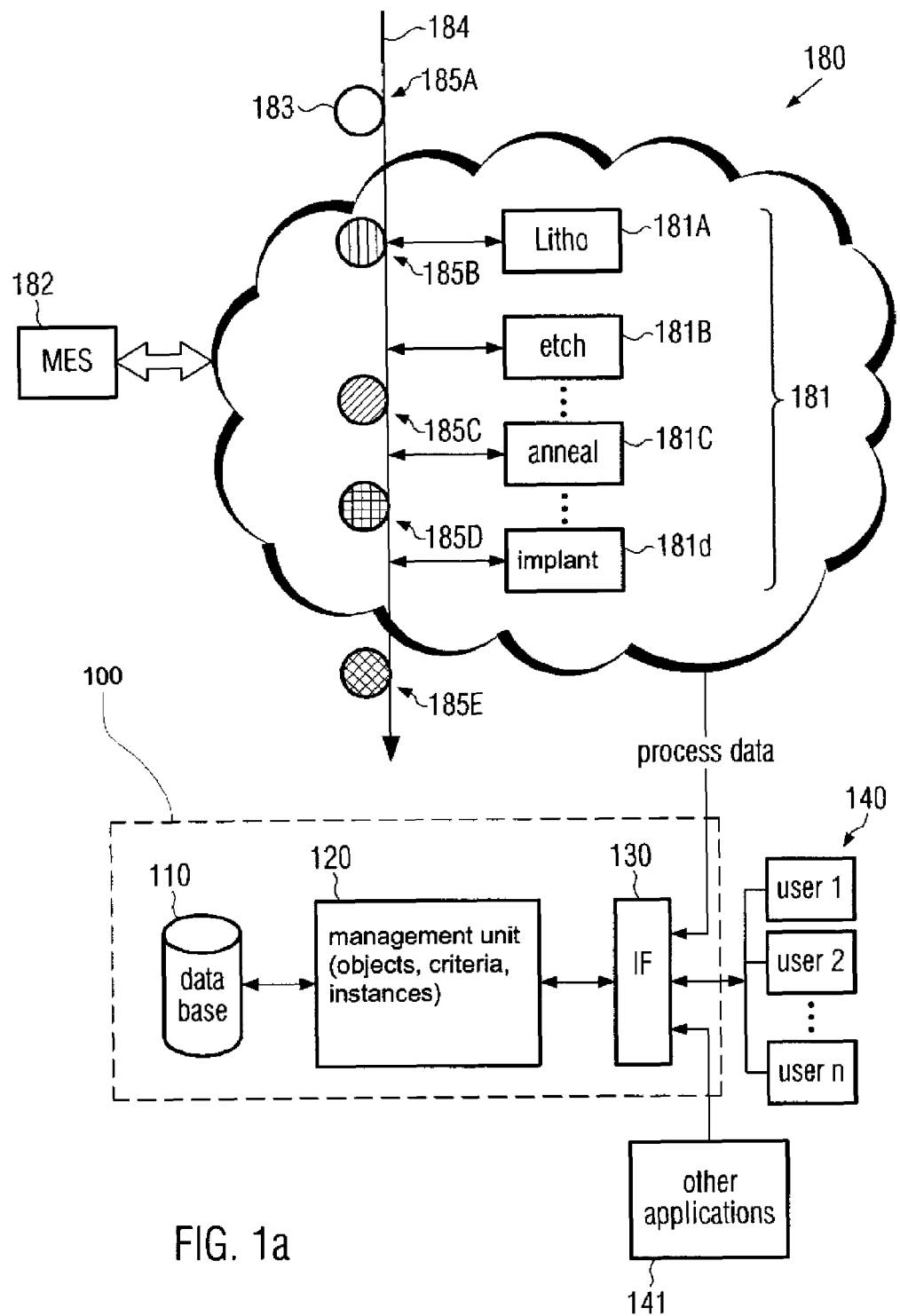
FIG. 1a schematically illustrates a manufacturing environment for processing products, such as semiconductor substrates, in a plurality of process tools, wherein the manufacturing environment may communicate process data to a product property management system for storing and maintaining product-related data according to illustrative embodiments disclosed herein.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein relates to a technique for managing process information relating to the assessment of the status of products at various process stages in a complex manufacturing environment, such as a facility for producing microstructure devices, wherein the respective process information may cover substantially the entire process flow or at least a portion thereof. For this purpose, the products passing through the manufacturing environment may be considered as objects, which may be associated with respective properties that may reflect the process flow, which the one or more objects or products have experienced within the manufacturing environment. Thus, at one or more process stages, i.e., in the individual process modules or related metrology departments, the products may be subjected to measurement procedures for evaluating the current status of the products at the specific process stage and for controlling respective process tools within the individual modules. Hence, significant efforts are made for obtaining the measurement data and to perform control and analysis tasks based thereon. As previously explained, in particular the analysis and evaluation of the measurement data, the corresponding correlation of that data with tool characteristics in the individual process modules, such as the occurrence of specific events in the form tool excursions and the like, may be performed individually in the respective modules. Therefore, it may be difficult for process engineers of other process modules to efficiently access the existing information when assessing the products and/or the status of the manufacturing environment at any other process stage. In order to enhance data availability and manipulation capabilities in a "process module independent manner," the subject matter disclosed herein provides a platform for managing information reflecting the evaluated characteristics of products at various manufacturing stages on the basis of a flexible, fast and standardized manner.

To this end, each product or object may be associated with appropriate standardized data structures, referred to as criteria, each of which may represent a discrete number of possible states of a specific property of the corresponding product or object. Hence, the criteria may represent the respective scenario of the manufacturing environment and may therefore enable a substantially complete monitoring of the history of one or more of the objects or products when processed in the manufacturing environment. For example, respective criteria may represent the assessment of measurement results obtained from the product under consideration at specified process stages, respective events experienced by the product under consideration during specified processes, such as queue times, process tool excursions, the status of process tools, consumables and the like, so that an efficient assessment of the overall performance of the manufacturing environment may be obtained on the basis of the respective evaluated criteria of the product under consideration. Furthermore, monitoring of various process modules of the manufacturing environment and their mutual interaction may be achieved, thereby providing the potential for improving the control quality of the process flow as a whole, since the mutual influences of the individual process modules on the finally obtained product may be assessed with increased accuracy and reliability.

In many complex manufacturing environments, corresponding "blacklists" may have been established in an attempt to provide a quantitative "overview" over a specified segment of the process flow, wherein, however, various data formats, such as individually selected data manipulation systems, depending on the operator, and the corresponding non-compatibility between various resources of process-related information, may result in a reduced applicability and reliability, while nevertheless requiring high operator input and experience. According to the principles of the subject matter disclosed herein, however, a respective system including predefined data structures for representing the properties of objects in a standardized manner in the form of criteria may provide an appropriate platform for storing and maintaining the process-related information in a highly standardized and, thus, accurate manner. A high degree of "individuality" may nevertheless be provided by providing a multi-user system, in which respective criteria may be "instantiated," in a userdependent manner, that is, one of the limited number of possible "values" of the criterion under consideration is actually selected by the user, thereby allowing different "assessments" of the same criterion of a specific product under consideration. Moreover, the data collection may be designed such that manual and automated recording of relevant process-related information may be accomplished in real time, thereby providing reduced response time with respect to assessing the performance of the respective manufacturing environment and identifying inefficient process modules and the like. Consequently, the subject matter disclosed herein provides a global "view" on a specified manufacturing environment or at least a significant portion thereof on the basis of standardized data formats representing the assessment of products at the individual process modules, thereby also providing the potential for enhancing documentation capabilities compared to conventional approaches, in that the standardized data format enables further data manipulation on a more general abstraction level, for instance by using free formats and attachments for recording the production-related information and for further analysis purposes.

Furthermore, even the integration of already existing systems with respect to process flow monitoring may be accomplished since existing data formats and information recording systems may be readily connected with the standardized data processing techniques disclosed herein, wherein, for instance, the usage of any appropriately modularized data structures offer the possibility of creating a highly flexible and adjustable system. That is, the representation of the product history on the basis of well-defined criteria of the objects according to a specified data format enables an efficient connection to other data manipulation systems using other data structures which may be readily adapted to the highly standardized format provided by the subject matter disclosed herein. Furthermore, by providing advanced search and filter capabilities, which may be readily implemented on the basis of the standardized data structures, the reliability of analyzing results due to the enhanced data completeness and the speed of obtaining a reliable assessment of the respective data may be significantly enhanced compared to conventional approaches, wherein a comprehensive record of the product history within the manufacturing environment under consideration may be concurrently obtained. For this purpose, the respective data and information may be stored and maintained in a single database, thereby providing a single point of data source, which may result in a significant reduction of process data preparation, while at the same time providing increased process data quality and integrity. Similarly, maintaining the data in a single database results in a single point of service, thereby reducing data maintenance efforts by providing a higher level of data standardization, data accuracy and completeness.

FIG. 1a schematically illustrates a manufacturing environment 180, which communicates with a "blacklist management system" (BLMS) or a product property management system 100, which provides a platform for standardized data management of process related "pre-assessed" information, as will be described later on. The manufacturing environment 180 may represent any production location in which one or more products 183 have to pass through a plurality of process modules 181 so that the one or more products 183 may be encountered at various process stages 185A, 185B, 185C, 185D, 185E when passing through a specified process flow 184. In one illustrative embodiment, the manufacturing environment 180 may represent a facility, or a significant portion thereof, of a process line for producing microstructure devices, such as semiconductor devices in the form of complex integrated circuits and the like. Thus, in this illustrative embodiment, the plurality of process modules 181 may comprise respective modules 181A, 181B, 181C, 181D, which may perform processes such as lithography processes, etch processes, anneal processes, implantation processes, deposition processes and the like. It should be appreciated that the individual process modules 181A, 181B, 181C, 181D may typically require a plurality of process tools, such as lithography steppers, step and scan devices, resist coating tools, post-exposure treatment tools, developers, inspection tools and the like. For convenience, any such individual process tools are not shown in FIG. 1a and may be represented as an entire respective process module 181A, 181B, 181C, 181D.

As previously explained, the respective process modules or the individual process tools used therein may be operated on the basis of respective control techniques, such as advanced process control (APC), statistical process control (SPC) and the like, in order to maintain the respective process result within specified process margins. Furthermore, in highly automated complex industrial environments, such as the environment 180, a supervising control system 182, which is typically referred to as a manufacturing execution system (MES), may be provided, which may to a certain degree coordinate the process flow 184 within the environment 180. For example, the system 182 may coordinate the supply of consumables and raw materials for the individual process tools in the respective process modules 181A, 181B, 181C, 181D, may instruct a corresponding automated transport system (not shown) to transport to and from respective process tools the one or more products 183 and may also communicate with respective process tools so as to obtain or supply process-related information.

During operation of the manufacturing environment 180, the products 183 may be released in a specific non-processed or pre-processed state which may correspond to a first manufacturing stage 185A. For example, the process stage 185A may represent a stage in which specific identifications and/or initial characteristics, such as degree of contamination, mechanical integrity and the like, assigned to the respective products 183 may be measured. In a next process stage 185B, the products 183 may have experienced one or more processes in one or more of the process modules 181A, 181B, 181C, 181D, for instance a lithography process, an etch process and the like, wherein any metrology processes may also be involved in order to provide respective measurement results indicating the status of the products 183, or at least specified representatives thereof, in the process stage 185B. Similarly, the further process stages 185C, 185D may represent corresponding stages in which the respective products 183 may have experienced further processes in the respective modules 181A, 181B, 181C, 181D, wherein it should be appreciated that one or more of the process modules 181A, 181B, 181C, 181D may be passed several times at different process stages, depending on the device requirements. Finally, the products 183 may be in a last process stage 185L, which may represent the product 183 after having experienced the entire process flow 184 associated with the respective manufacturing environment 180. It should be appreciated that the manufacturing environment 180 and the respective process flow 184 performed therein may not necessarily represent a manufacturing environment for entirely completing a product under consideration, while nevertheless a plurality of process modules 181A, 181B, 181C, 181D have been passed, wherein the process stage 185A may be considered as an initial stage and the process stage 185L may be considered as a final stage, irrespective of whether the products 183 are actually non-processed in the stage 185A and are entirely completed in the stage 185L. Furthermore, the process flow 184 may include a plurality of variations, depending on the respective products 183 to be formed, as, for instance, in a semiconductor facility, typically a plurality of different products are simultaneously processed in the environment 180. Consequently, the process history, which may be represented by the plurality of process stages 185A, 185B, 185C, 185D, 185E for forming various pre-forms of the microstructure devices through the process flow, may be different for different products 183, wherein, for convenience, any such differences may not be explicitly referred to in the following description. As previously explained, enhancing the performance of the environment 180 may be accomplished by individually enhancing performance of the respective process modules 181A, 181B, 181C, 181D and also taking into consideration the mutual interdependencies of the respective modules, which typically requires a substantially complete documentation of the process history of the products 183.

For this purpose, in the present disclosure, the management system 100 communicates with the manufacturing environment 180 so as to receive therefrom process-related data which contains information about the assessment of the various process stages 185A, 185B, 185C, 185D, 185E for the products 183, that is, the information obtained by the management system 100 may include the assessment of measurement data generated in the individual process modules 181A, 181B, 181C, 181D, specific events that may have occurred in the individual process modules and the like.

The management system 100 may comprise an interface 130, which is configured to receive the process-related data from the environment 180, wherein, in one illustrative embodiment, a substantially real time data communication may be established with at least a portion of the environment 180. For this purpose, the interface 130 may communicate with the system 182 for obtaining therefrom the required process-related data, such as tool status of respective process tools, data with respect to queue times of the specific substrates 183 in certain process modules, pre-processed measurement results describing the process result of specific process modules, analysis results and the like. Furthermore, the interface 130 may be configured to communicate with a plurality of user interfaces 140, which may be used for data input, data manipulation and/or data output. For example, the process-related information from the environment 180 may be, additionally or alternatively, entered via the user interfaces 140. For instance, the user interfaces 140 may comprise scripts in the form of automated scripts or manually supplied scripts for data loading and reporting and the like. The user interfaces 140 may also comprise means for interactive data exchange so as to manipulate data of the system 100, define data structures therein and the like, as will be described in more detail later on. The user interfaces 140 may comprise intranet- or internet-based interfaces or may include stand alone applications, such as Windows or Unix systems. Furthermore, the interfaces 130 may be configured to communicate with other applications 141, such as interface modules for analyzing tools, or any appropriate data manipulation tools and the like, which may enable an efficient user interaction and data input when provided in combination with the user interfaces 140. Furthermore, the applications 141 may provide additional advanced searching and filtering capabilities, which may also be efficiently used by any user interacting with the system 100 on the basis of the user interfaces 140. Furthermore, automated data analysis may be performed by the applications 141 based on the predefined data structures in order to, for instance, provide respective data analysis on a regular basis, wherein the respective substantially complete process histories of the products 183 may provide enhanced reliability and accuracy of the corresponding analysis results.

The management system 100 further comprises a management unit 120, in which respective data structures may be created, manipulated and handled to enable a highly standardized recording of information including the assessment of product and tool characteristics in the individual process modules, such as the "blacklists" of individual process engineers, which may thus represent the respective process histories of the products 183 based on the various manufacturing stages 185A, 185B, 185C, 185D, 185E, as previously explained. In one illustrative embodiment, the management unit 120 may be based on data structures associated with objects, i.e., the products 183, wherein the data structures may be referred to as criteria, which may be considered as representatives of properties of the products 183, wherein a specific criterion is to be "instantiated," that is, a certain quality or "value" of a predefined limited number of possible values of the criterion has to be selected in order to endow the respective product or object with a specific property at a specified manufacturing stage. Thus, the management unit 120 provides the platform for a highly standardized data structure for handling the process-related data received via the interface 130 from the manufacturing environment 180.

The system 100 further comprises a database 110, which may have any appropriate configuration to store and maintain therein the data structures created and instantiated by the property management unit 120. In one illustrative embodiment, the database 110 may represent a data storage structure representing a single point of data source, that is, the data structures contained therein may represent the entirety of process-related data obtained from the environment 180, from the user interfaces 140 and from the other applications 141. Similarly, the database structure 110 may represent a single point of service, that is, all process-related and evaluated information may be maintained in one database structure, that is, the structure 110, thereby providing an efficient data manipulation structure with high speed and relatively low degree of complexity.

During operation of the system 100, respective criteria for the objects, for instance the substrates 183, may be created as appropriate standardized data structures for handling the process-related information obtained from the interface 130.

FIG. 1b schematically illustrates a data structure as created and/or used in the property management unit 120 and the database 110 of the system 100 according to one illustrative embodiment. In FIG. 1b, first, a data structure may be established associated with an object 121 of interest, which in the case of the manufacturing environment 180 represents a product experiencing the process flow 184. For instance, if the manufacturing environment 180 represents a facility for fabricating microstructure devices, the respective products may represent single substrates and/or groups of substrates which are frequently referred to as lots. Thus, the objects 121 may represent individual substrates, the process history of which may be recorded on the basis of the plurality of process stages 185A, 185B, 185C, 185D, 185E. Each of the objects 121 may be described by one or more criteria 122, which may represent the "frame" for specifying the properties of each of the objects 121 when assigning one or more of a limited number of actual values to the various criteria 122. In the lower part of FIG. 1b, the various criteria 122 are shown as each having respective "values," which may represent numerical values or any other characteristic terms for providing a distinct assessment of the criterion under consideration. For instance, the various values belonging to a respective criterion 122 may represent a restricted number of predefined numerical values, a restricted number of predefined value ranges and the like. In other cases, the values may represent a quality of a specific property. For instance, if the criterion 122 represents the effect of a specified tool status, such as a consumable immediately prior to maintenance and the like, the various values of the specified criterion may be represented by "strongly affected, medium affected, slightly affected" and the like. Consequently, the respective criterion provides the potential for efficiently describing direct and indirect influences of process tools on specified objects 121, i.e., products 183. Other criteria 122 may represent the evaluation of specific measurement results, which may, in a more or less direct manner, represent the effects of one or more processes and thus process tools on the object under consideration. For instance, one of the criteria 122 may represent the evaluation of measurement results of a thickness measurement, the measured size of critical dimensions, the defect scans and the like, wherein the plurality of restricted values of the respective criterion represent the possible values of the evaluation. For instance, the respective measurement data may be evaluated, for instance by defining the values as "acceptable," "non-acceptable" and the like. It should be appreciated that specific criteria, such as respective criteria describing subjective characteristics, may, in some embodiments, be "instantiated" differently for the same object, thereby providing the potential for individually adapting the properties associated with a specific object under consideration. For instance, a user may wish to maintain different "views" of specific criteria, or different users may be allowed to individually instantiate one or more of the criteria 122, as will be described in more detail later on.

Furthermore, in some illustrative embodiments, the criteria 122, or at least some of the criteria, may be associated with additional information, such as any comments describing the function or the evaluation of a specific criterion in more detail. Furthermore, any system-internal information, such as the date of creation of the respective criterion and the like, may also be associated with the criterion under consideration. In still other illustrative embodiments, further data files may be attached to the respective criterion, for instance in the form of Word documents, Excel spreadsheets and the like.

FIG. 1*c* schematically illustrates the process of "instantiating" a specific criterion as may be performed in the management unit 120 upon user interaction, wherein it should be appreciated, in FIG. 1*c*, one of the objects 121, for instance object 1, may be associated with a specific criterion, for instance criterion 1, when process-related information obtained by the system 100 may indicate that object 1, i.e., a product 181 under consideration, may "encounter" the criterion 1 at a specified process stage. For instance, if criterion 1 represents a specific tool status, for instance an excursion of a specific process tool, an operator or any other "user," such as the MES 182 and the like, may recognize that the product under consideration, i.e., the object 1, has been processed by the respective process tool. In this case, measurement data or other process-related data available for object 1 may be used for instantiating the criterion 1, i.e., for selecting one of the specified characteristic values thereof, for instance value 1 as indicated in FIG. 1*c*. Thus, in this case, an "instance" 123 of the criterion 1 is defined having a unique identifier, such as the identification "1," wherein the instance 123 represents an evaluated property of the object 1, while the general property is represented by the criterion 1. In the above example, the value 1 may, for instance, represent the value "strongly affected" when the corresponding measurement results as assessed by the corresponding user indicate a high influence on the respective object 1. Furthermore, as previously explained with reference to FIG. 1*b*, in this stage of manipulation of data structures in the management unit 120, any comments or attachments for object 1 may also be added to the instance 123 to provide increased comprehensibility of the respective process of instantiating the instance 123. Consequently, by providing a respective number of criteria, which may represent the various manufacturing stages 185A, 185B, 185C, 185D, 185E and by actually instantiating the respective criteria, a process history of one or more products or objects under consideration may be established in a standardized manner wherein the degree of "coverage" of the process flow 184 may be defined by the number and type of criteria created. Thus, respective criteria may be instantiated at the various process modules and are thus available for being accessed via the user interfaces 140.

In some illustrative embodiments, the creation, i.e., the definition of specific criteria, may be performed at any time, thereby providing a high degree of flexibility of the system 100, since the degree of coverage of the process history of respective products may be dynamically adapted to the corresponding manufacturing environment, while nevertheless existing concepts may still be used for established data analysis strategies and the like. For example, specific "well-established" criteria may be used for evaluating one or more aspects of the process flow 184, for instance on the basis of regular analysis activities and the like, while further criteria may be simultaneously created to take into consideration new developments within the manufacturing environment 180, for instance in view of newly established measurement techniques and the like. In this way, the process monitoring capabilities of the system 100 may be adjusted on the basis of the environment 180 and/or on the basis of user-specific considerations.

FIG. 1*d* schematically illustrates a data structure according to a further illustrative embodiment, wherein instances 123 may be equipped with a further functionality in order to provide the possibility of indicating the status of the respective instance. For this purpose, a corresponding characteristic indicated as "status" may be defined within the respective data structure "instance," wherein the status may be set to a limited number of predefined characteristic values. For instance, in one illustrative embodiment, the "status" characteristic may be used for "qualifying" the currently valid value of the property represented by the characteristic value of the respective instance. In the example shown in FIG. 1*d*, currently value d of instance 1 quantifies the respective criterion, wherein the respective values of the status may give an indication of the reliability of the respective value 1 and the like. Generally, the status may be used for appropriately "flagging" a respective instance wherein, for the example described before, a specific value of the status flag, such as "to define," may indicate that a further review of the respective property, currently described by the value 1, may be required. In this example, other status flag values may be "defined" and "undefined," in order to indicate a high reliability of the respective property or a situation that is difficult to assess, respectively. For instance, if a user of high reliability with respect to instantiating a certain criterion may select a respective characteristic value, the respective status flag may be set to the status "defined" so as to provide a high degree of objectivity for this criterion. If, on the other hand, a respective instance may not be reliably assessed at the current process stage, the respective status flag value may be set to "undefined," wherein additional information, such as respective measurement results, images and the like, may be attached to the respective instance to provide the base information for assessing the corresponding criterion.

FIG. 1*e* schematically illustrates the data structure according to a further illustrative embodiment in which, in addition to the "status," or alternatively, a further characteristic information may be incorporated into a respective instance in order to enable a multi-user configuration. As previously explained, at least some of the plurality of criteria that are available for describing the process history of a specified object may be highly dependent on the "view" or "opinion" of a respective user. Hence, a respective user ID may be incorporated into the data structure to define a user dependent instance, thereby providing the potential for incorporating specific engineering knowledge and experience into the system 100. Consequently, the system 100 provides a high degree of data reliability on the basis of a desired degree of coverage of the respective process history, while nevertheless individual assessments and opinions may be incorporated, thereby creating a platform for high expertise in combination with increased data reliability and data completeness.

In further illustrative embodiments, access to the system 100, i.e., the management unit 120 via the interface 130, may be organized according to a predefined hierarchy structure, wherein, for instance, company-internal requirements may be used as a basis for implementing a respective hierarchy for accessing the system 100.

FIG. 1f schematically illustrates a hierarchical structure according to one illustrative embodiment. In the highest hierarchy level, a user operating at this level may be allowed to define criteria, that is, generate a respective data structure for representing process events, evaluations of measurement events and the like, wherein the definition of the respective criterion may also include the provision of appropriate characteristic values used for actually defining the respective property of the object under consideration.

In a next lower hierarchy level, a user operating at this level may be allowed to define respective instances, i.e., to select a respective characteristic value for a criterion of interest, to which the user has access, as is previously explained. At a lowest hierarchy level, access to public instances may be granted in order to provide the information of the system 100 to a large number of users without risking data integrity by manipulation of non-experienced users. A request by a user to define one or more of the criterion may be refuted when the request violates the access handling hierarchy that establishes the rights of the user. It should be appreciated that the hierarchy structure of FIG. 1f represents an illustrative example for managing access rights for the system 100. For instance, a more detailed hierarchy structure may be established by defining the corresponding access rights in more detail. For example, the definition of criteria may be performed on the basis of specific "expertise classes," wherein specific criteria may only be defined by a member of the respective expert group. For example, criteria relating to a specific process module, such as the lithography module 181A, may be defined by a respective group of process engineers having the required experience and expertise for this process module. A similar concept may be applied to the next lower hierarchy level in order to allow the definition of certain instances to be executed by specified users only.

FIG. 1g schematically illustrates a data structure for implementing an efficient access right management system, which may incorporate the hierarchy structure as shown in FIG. 1f, or may implement an appropriate portion thereof. In this example, the data structure representing a specified criterion may further be based on a characteristic indicating access rights at the "criterion level," indicated as "criterion rights." For example, write access may be granted to users specified in the respective criterion, for instance a respective user identification may be implemented in the data mask, wherein a write access may only be allowed if the user may correctly identify itself upon accessing the respective criterion data structure for a new criterion or to edit a currently existing criterion. For instance, a user having the access right "write" may add or delete or change any of the characteristic values included in the respective criterion. In other cases, a new criterion including respective characteristic values may be set up by the corresponding user. Similarly, a read access may individually be defined for a respective criterion by implementing respective user identifications. Similarly, respective instance rights may also be implemented in the respective data structure, which may be "activated" when the associated criterion is actually instantiated. For instance, a user having the right to access the corresponding instance may therefore select an appropriate characteristic value and may assign the respective criterion to a specified object, as is previously explained. Similarly, the read access to a specific instance may also be controlled by respective user identifications. However, any other management of access rights may be implemented, as required by company-internal requirements.

Figure 1H:
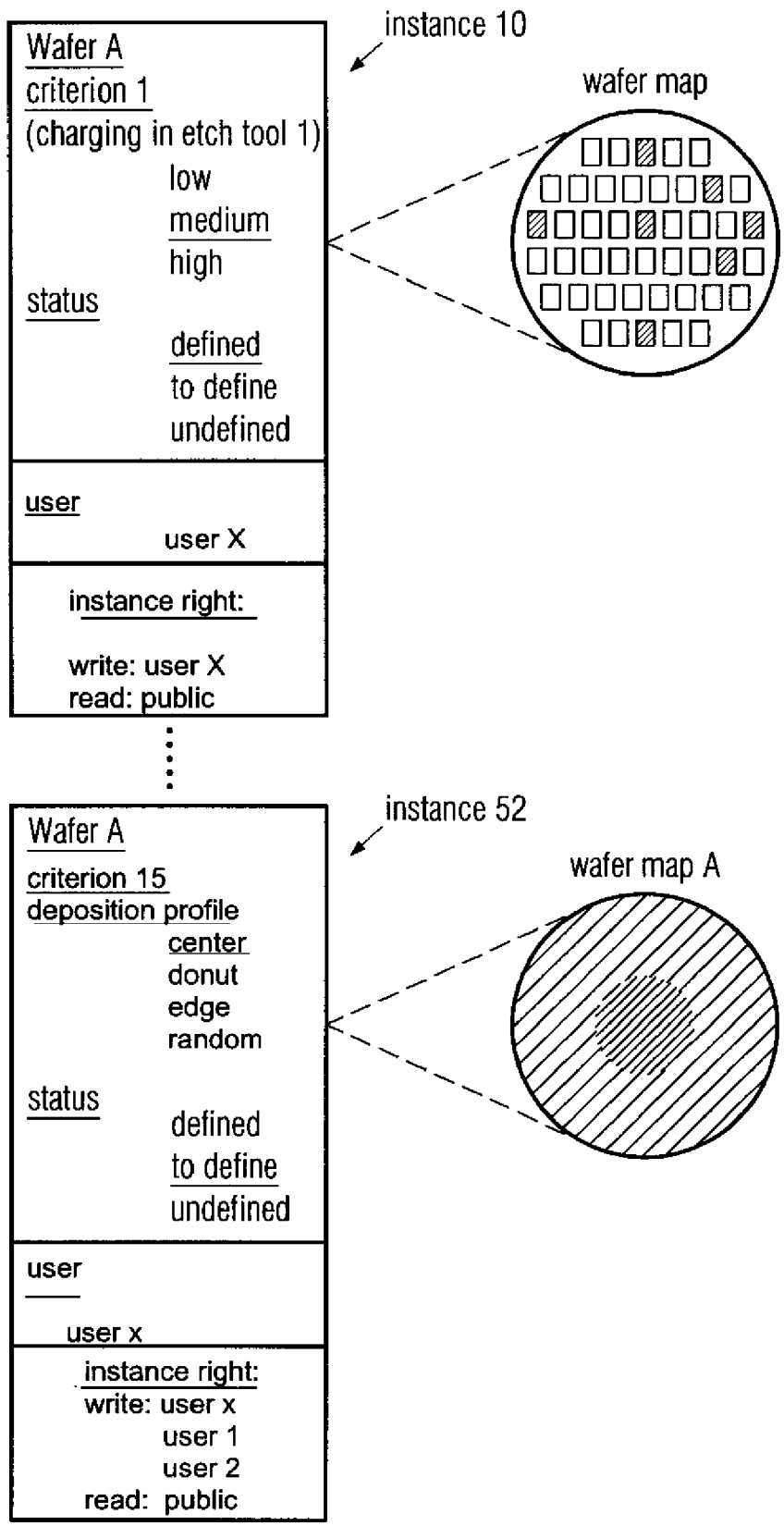
FIG. 1h schematically illustrates data structures for use in a semiconductor facility according to illustrative embodiments disclosed herein.

FIG. 1h illustrates an example for a plurality of instances of a wafer A as a representative object of the manufacturing environment 180 when representing a semiconductor facility. Thus, the wafer A may have experienced one or more of the process stages characterized by one or more instances associated with the wafer A. An instance, as shown, may present the degree of substrate charging in an etch tool, indicated as etch tool 1, which may belong to the process module 181B. In this example, a user X, for instance, a process engineer of the corresponding process module, may be defined to have the right to define the corresponding instance for wafer A on the basis of criterion 1. That is, the etch tool 1 may provide a respective measurement data that is evaluated by the specified user X who may then select a respective characteristic value for the criterion 1. In the present example, the value "medium" may be selected by the specified user, thereby defining a unique instance, which may have, in the present example, the identification 10. Furthermore, since the measurement data and the respective evaluation by the user X may have a high degree of reliability, the respective status of instance 10 may be selected as "defined." Additionally, instance 10 may be associated with a respective wafer map, which may include a more detailed representation of the respective measurement data obtained from etch tool 1. In the present example, read access may be granted to any user, as indicated by the value "public" so that the corresponding information including the wafer map or any other attachments may be available for any user accessing the system 100. As previously explained, the product or object, such as the wafer A, may have a plurality of instances in order to provide a desired degree of coverage of the respective process flow 184.

As a further example, a further instance indicated as instance 52, may be provided for the wafer A, wherein the instance 52 may represent an instantiated criterion 15, which may represent the deposition profile, for instance, of a metal layer formed on the basis of an electrochemical deposition process. Respective characteristic values for the criterion 15 may be "center," "donut," "edge" and "random." A corresponding measurement data set provided for a corresponding metrology tool, indicated as tool 1, may be attached to instance 52, wherein the respective instance may be written to or defined by a user 1, or a user 2, as indicated in the corresponding instance rights field. For example, user 1 may have accessed instance 52, thereby assessing the respective measurement data provided by metrology tool 1 as indicating a centered deposition profile wherein, however, the respective user may indicate instance 52 as requiring a further review in a later stage, thereby indicating the status of instance 52 as "to define." Instance 52 may have been created as a publicly available instance, which may therefore be accessible for read access by any user of the system 100. Similarly, a plurality of other instances may be assigned to the wafer A, wherein respective instances may be defined by a limited number of users and may also be accessible for a read operation by dedicated users, as specified on the access rights management structure, as is for instance illustrated in FIG. 1f.

As a result, the subject matter disclosed herein provides an efficient management system for handling process-related evaluated data of a complex manufacturing environment, which may indicate the evaluation of various users, such as process engineers, with respect to the status of the products and the process tools at various process stages. For this purpose, at least some of a plurality of specified criteria in a standardized data format may be assigned to respective products and the data structures may be stored and maintained in a common database in order to monitor the respective process history of the products under consideration in a more complete and reliable manner. The degree of coverage of the respective process history may be adjusted by appropriately creating respective criteria, which may indicate the status of the products at a plurality of process stages, wherein the number of process stages, as well as the number of respective criteria, may be adapted according to the requirements of the respective manufacturing environment. Due to the standardized data structure, which may enable, in some illustrative embodiments, the attachment of any appropriate additional information, such as measurement data, description and comments and the like, a high degree of data integrity and accuracy may be accomplished, while nevertheless modifications of the manufacturing environment as well as the respective process flow may be readily accommodated by defining respective criteria. The process-related data structure may be stored and maintained within a single database structure, thereby uniting the various process-related information provided by the various process modules of manufacturing environment in the form of data evaluations and the like. Due to the provision of the standardized process-related information, analysis of process data may be performed with a high degree of reliability, wherein, nevertheless, user dependent assessments of specific process stages may be allowed. A multi-user system is therefore provided, wherein no access conflict may be generated, since for each criterion or process-related issue, a corresponding list of respective instances may be accessible by corresponding users having the respective right for reading the corresponding instances. In a semiconductor facility, wafer and lot level related criteria may be handled, wherein a plurality of instances of each respective criterion may be established, depending on the process requirements. Furthermore, in some illustrative embodiments, an efficient mechanism for managing the user rights may be implemented to install for non-public criteria appropriate restrictions, for example for critical process-related data, thereby providing enhanced filtering capabilities with respect to company-internal requirements. For example, highly sensitive data, such as respective data of electrical wafer tests and the like, may be made visible to authorized users only. Furthermore, due to the standardized data structures, the management system disclosed herein may provide enhanced filtering, sorting and searching capabilities, wherein, additionally, external resources, such as analysis tools and the like, may be connected via the respective interfaces in order to even further enhance the ability of the property management system. For instance, objects, images, substrates or substrate groups which are connected to a specific criterion may be searched. Respective product lists may be created including the creation of history and statistical information, for instance in the form of weekly determined statistics and the like. Furthermore, based upon the respective statistical information, the status of the respective analysis strategy may be tracked. Moreover, the data acquisition and conversion into data structures handled by the inventive management system may allow a high degree of automation, thereby significantly reducing the "response time" of the system with respect to the current status of the process flow under consideration. Consequently, the assessment of process-related data may be performed on the basis of a united database including the assessments of individual users of the entire manufacturing environment, thereby avoiding double work with respect to data analysis, since respective analysis or other process-related information created by the individual process engineers is available for any user, if indicated as a valid user, upon entering the data into the data base. Thus, "blacklists" of individual process modules and engineers may be managed by a single management system on the basis of a standard data structure.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
defining a plurality of criteria for products of a manufacturing environment, each of said criteria represented by a predefined data structure stored in a database structure for representing a property of a product at least one of a plurality of manufacturing stages of a process flow performed in said manufacturing environment using a plurality of process tools, each of said criteria comprising a respective limited set of predefined characteristic values;
receiving process data from said manufacturing environment, said process data comprising information about said at least one of said plurality of manufacturing stages of said products;
operating on one of said predefined data structures to select one of said characteristic values associated with said one of the plurality of criteria based on said process data, said selected characteristic value providing a qualitative descriptor of said process data and defining a first instance for said one criterion; and
storing and maintaining said predefined data structures associated with said plurality of criteria and said products in said database structure.

2. The method of claim 1, further comprising defining at least respective criterion for each of said plurality of manufacturing stages.

3. The method of claim 1, further comprising estimating a process efficiency of said manufacturing environment on the basis of said criteria maintained in said database.

4. The method of claim 1, further comprising independently selecting, by a second user, for said one of said criteria one of said characteristic values of said one criterion on the basis of said process data to define a second instance of said one criterion.

5. The method of claim 1, wherein each data structure comprises a status flag indicating a status of the criterion associated with a respective data structure.

6. The method of claim 1, further comprising attaching additional information to at least some of said data structures representing said criteria and storing and maintaining said additional information in said database.

7. The method of claim 1, wherein defining said plurality of criteria comprises refuting a request for defining one or more of said criterion when said request violates a pre-established access handling hierarchy.

8. The method of claim 7, wherein selecting one said characteristic values for said one of the criteria comprises checking an identity of said first user and denying access when said first user is indicated as invalid user in said data structure representing said one criterion.

9. The method of claim 1, further comprising retrieving data from said database using said first instance as at least one of a filter criterion and a search criterion.

10. The method of claim 1, wherein said products are processed substrates having formed thereon pre-forms of a plurality of microstructure devices.

11. The method of claim 1, wherein a plurality of criteria are defined for one or more of said plurality of manufacturing stages.

12. The method of claim 1, further comprising performing an analysis process based on said predefined data structures maintained in said database by automatically accessing said database.

13. A product property management system, comprising:
a property management unit configured to define and manipulate, upon user interaction, predefined data structures representing criteria of products processed by a plurality of process tools of a manufacturing environment according to a specified process flow including a plurality of manufacturing stages, each criterion associated with a respective set of limited characteristic values, each characteristic value indicating qualitative descriptor of a property of one of said products assessed by one or more users based on process data from said manufacturing environment comprising information about said at least one of said plurality of manufacturing stages;
a database structure operatively connected to said property management unit, said database storing and maintaining each of said predefined data structures; and
an interface operatively connected to said property management unit and configured to receive and output process information relating to said products and said plurality of process tools of the manufacturing environment and to enable said user interaction.

14. The product property management system of claim 13, wherein said interface is configured to provide real time communication with user interfaces connectable to said interface.

15. The product property management system of claim 13, wherein said product property management unit is further configured to attach a process information in a predefined data format to each of said data structures.

16. The product property management system of claim 15, wherein said process information is stored and maintained in said database.

17. The product property management system of claim 13, wherein said management unit is further configured to assess access requests for accessing said database on the basis of a predefined access hierarchy.

18. The product property management system of claim 13, wherein each of said predefined data structures comprises a status field for indicating a status of information evaluation defining a selected one of said characteristic values.

19. The product property management system of claim 13, wherein said management unit is further configured to provide search and filtering functions at least with respect to said characteristic values selected in respective criteria represented by respective data structures.

20. A method, comprising:
defining a predefined data structure in a database for representing a plurality of criteria for products of a manufacturing environment upon user request, each criterion representing a property of a product at one of a plurality of manufacturing stages of a process flow performed in said manufacturing environment using a plurality of process tools;
receiving process data from said manufacturing environment, said process data comprising information about said at least one of said various manufacturing stages of said product;
assigning to one of said criteria by a request of a first user one of a plurality of predefined limited values associated with said one criterion on the basis of said process data to define a first evaluated version of said one criterion associated with said first user, said criterion providing a qualitative descriptor of said process data; and
storing and maintaining said first version associated with said one criterion and said product in said database, said database providing a single point of service and a single point of data source.

* * * * *

UNITED STATES PATENT AND TRADEMARK OFFICE
CERTIFICATE OF CORRECTION

PATENT NO. : 7,725,497 B2 Page 1 of 1
APPLICATION NO. : 11/844059
DATED : May 25, 2010
INVENTOR(S) : Lutz Thieme and Stefan Schueler It is certified that error appears in the above-identified patent and that said Letters Patent is hereby corrected as shown below:

Col. 16, line 37 (claim 1, line 5), delete "product at least one" and insert therefor
-- product at at least one --.

Signed and Sealed this

Twenty-ninth Day of June, 2010

David J. Kappos
*Director of the United States Patent and Trademark Office*